March 18, 1930.  E. WILDHABER  1,750,981
DIFFERENTIAL MECHANISM
Filed Feb. 7, 1928    2 Sheets-Sheet 1
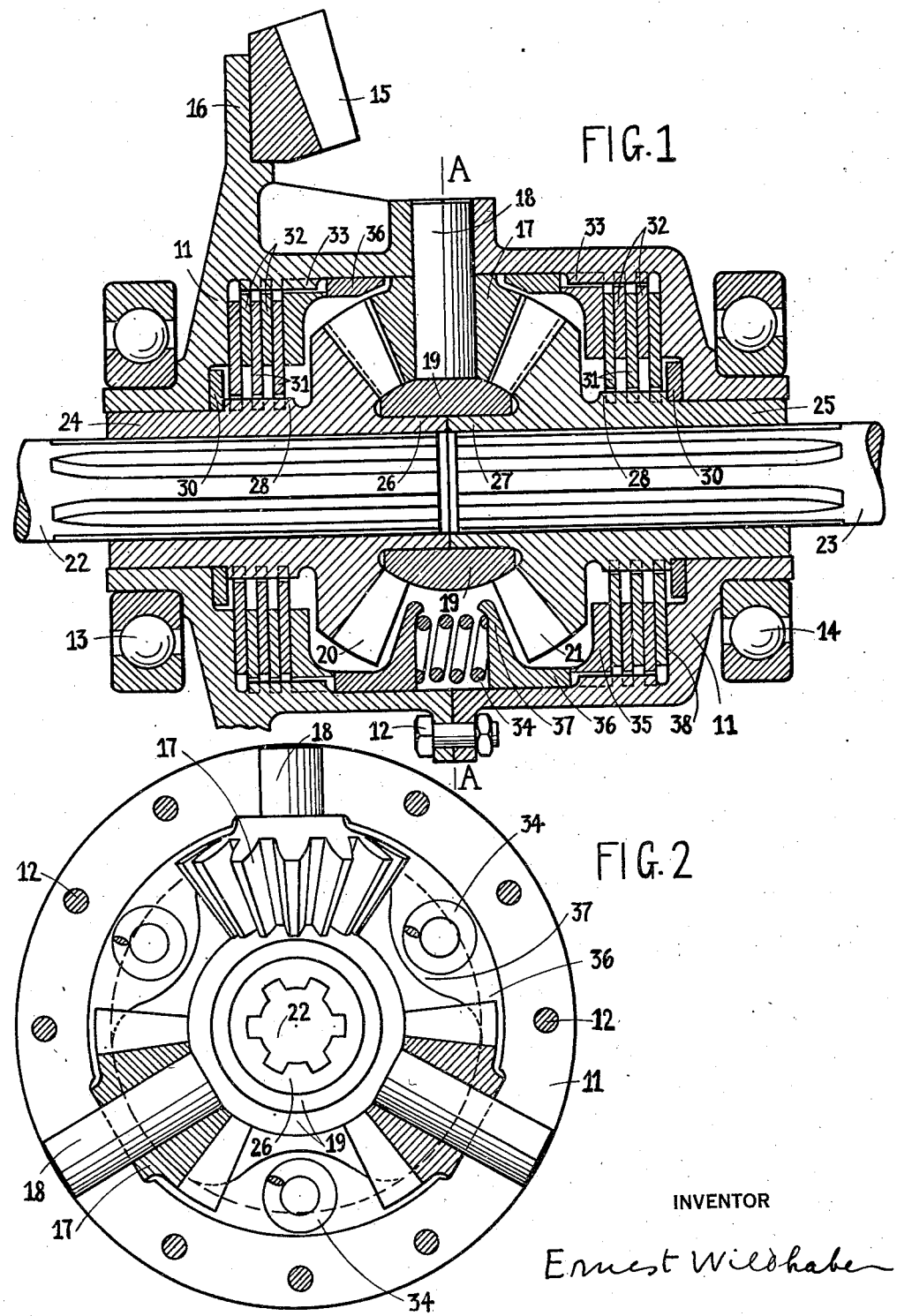
INVENTOR
Ernest Wildhaber March 18, 1930.  E. WILDHABER  1,750,981
DIFFERENTIAL MECHANISM
Filed Feb. 7, 1928  2 Sheets-Sheet 2

WITNESSES
Joseph Gstyr
Kurt Humbert

INVENTOR
Ernest Wildhaber

Patented Mar. 18, 1930

1,750,981

UNITED STATES PATENT OFFICE

ERNEST WILDHABER, OF BROOKLYN, NEW YORK

DIFFERENTIAL MECHANISM

Application filed February 7, 1928. Serial No. 252,499.

The present invention relates to differential mechanisms, and particularly to differential mechanisms of the character used in automotive vehicles, for driving a plurality of wheels from a single source of power.

As well known, a differential mechanism permits to apply torque to two driven members in a manner which permits relative motion of said driven members, so that the driven wheels of a vehicle may adapt their motion to the path of the vehicle.

The function of a differential gear of conventional structure can be briefly summed up by stating that it applies equal torque to its two driven members, that is to say for instance to the two wheels of a rear axle. When one of these wheels slips and fails to find hold on the ground, it cannot transmit any substantial amount of torque, and in consequence little or no torque can be transmitted to the other wheel. In such moments the vehicle is out of control.

A number of devices have been already proposed in order to remedy this condition. Most of these, however, are too complicated or too inefficient for practical adoption.

One object of the present invention is to remedy this said condition with very simple means, which are inexpensive as well as durable. Another object is to provide a differential mechanism containing a sufficient amount of internal friction, which is practically independent of the load transmitted through the mechanism. A further aim is to devise a differential mechanism, which contains a sufficient and substantially constant amount of internal resistance or locking friction, irrespective of the degree of relative motion. A further aim is to provide a differential mechanism containing an equal amount of internal friction when starting and when maintaining relative motion between the two driven members of the mechanism.

A still other object is to provide a novel differential mechanism containing internal friction maintained by spring pressure, and a differential mechanism containing a multiple disk clutch held in continuous engagement by spring pressure.

Other objects will appear in the specification and from recital of the appended claims.

My invention is exemplified in the accompanying drawings, in which

Fig. 1 is an axial section of a differential mechanism constructed in accordance with the present invention.

Fig. 2 is partly a view, partly a section along lines A—A of Fig. 1, at right angles to the axis of the mechanism.

Figure 3:
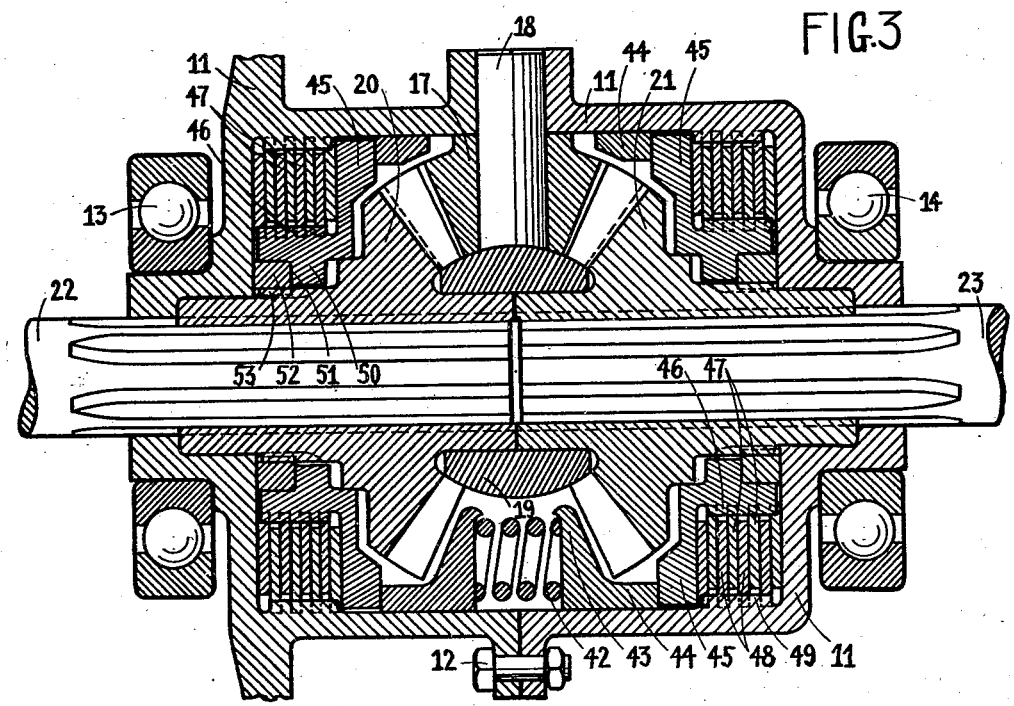
Fig. 3 is an axial section through another preferred form of differential mechanism, constructed according to the present invention.

In Fig. 1 and Fig. 2 the numeral 11 denotes a planetary casing composed of two parts, which are bolted together by means of screws 12. Casing or cage 11 is mounted in two bearings 13, 14, and contains a bevel gear 15, which is secured to a flange 16 of said casing. Drive is applied to casing 11 from a motor in known manner, through a pinion which is not shown, and which meshes with bevel gear 15. Planetary bevel pinions 17 are rotatably mounted on journals 18, which latter are integral with a hub 19. Journals 18 and hub 19 constitute a piece, which is rigidly secured to and forms part of the planetary casing or planet carrier 11. The planetary pinions 17 mesh with two bevel gears 20, 21, which form part of the driven members of the mechanism and which are connected with splined shafts 22, 23. These shafts apply motion for instance to two wheels of a rear axle.

What has been thus far described is a differential gear of conventional structure, as commonly used in automotive vehicles. A differential gear of this character contains three coaxial members, namely a driving member and two driven members. In the case illustrated in Fig. 1 and Fig. 2 the planet carrier or planetary casing constitutes the driving member, and the two bevel gears 20, 21 form part of the driven members.

The bevel gears 20, 21 are mounted with their hubs 24, 25 directly in the planetary casing 11, and with extensions 26, 27 in the hub 19. The hubs 24, 25 contain splined portions 28, and a ring 30 disposed adjacent the end of said portions. Ring 30 is secured to gear 20, or 21 respectively, in any suitable known manner, and serves to transmit endwise thrust of the respective gear to casing 11.

Disks 31 are connected with the hubs 24, 25 by means of the said splines 28, and engage in frictional contact with other disks 32, which alternate with disks 31. Disks 32 are secured to casing 11 through splines 33. Splines (28, 33) form a positive connection angularly, as is well known, while permitting axial adjustment, that is adjustment along said splines.

The disks 31, 32 are maintained in engagement, under pressure, by springs 34, see Fig. 2, which act on a circular body 35 through a body 36. The latter body forms cups or plates 37 for holding the springs. The springs 34 are disposed intermediate the planetary pinions 17.

The disks 31, 32 are maintained under constant pressure between body 35 and the plane side 38 of casing 11.

It is particularly noted that the operation of the multiple disk clutch, which is constituted by the disks 31 and 32, is entirely independent of the tooth load and axial thrust exerted upon gear 20 and gear 21. The thrust of the gears is transmitted to the said rings 30 and thence is applied directly to casing 11. The pressure between the disks 31, 32 is caused solely by springs 34, and is therefore constant. This feature not only improves the mesh of the bevel gears with the planetary pinions, by providing a constant axial position of the gears, but its chief importance lies in the principle of operation of the mechanism, as will now be described.

The mechanism constructed according to the present invention on the other hand provides the same locking effect irrespectively of the tooth loads transmitted. There will always be a certain locking effect, which is sufficient to maintain a car under control on wet roads and also on icy roads, as long at least as one of the wheels grips the ice, and under other circumstances. When a car turns while the gears are under heavy load, the said locking effect exists too. It remains the same as under any other circumstances, and in this case will not be felt in steering, because of its smallness as compared with the heavy torque exerted on the gears. The mechanism provides therefore a sufficient locking effect when needed, and does not constitute any appreciable drawback to steering under any circumstances.

The chief advantage of the present mechanism, aside of its function on a correct principle, is its simplicity. It constitutes a safety mechanism, without adding much to the costs of the differential.

A slight deficiency retained in the above described embodiment resides in the fact, that the locking effect is larger when relative motion starts between the two driven members, than when it is maintained. This feature is caused by the law that all friction between solids is larger in the state of rest than in the state of relative motion. This is well known, and is usually expressed by the statement, that the frictional coefficient is larger for rest than for motion. The difference is especially pronounced when the frictional contact is under lubrication, that is to say when the frictional surfaces are wet or moist with oil or grease or with another lubricant. This is exactly the case in the structure under consideration. The disks 31, 32 of the embodiment illustrated in Fig. 1 and Fig. 2 are liable to be covered with grease contained in the differential casing, and while means for preventing the lubricant from reaching the disks 31, 32 might be provided, such means would complicate the mechanism and would nevertheless not provide a satisfactory solution. They would not eliminate, but only reduce the deficiency.

In accordance with the present invention further embodiments are provided, with which the frictional torque and consequently the locking effect of the differential mechanism may be kept practically constant, whether the frictional surfaces are relatively at rest or at motion.

Figure 5:
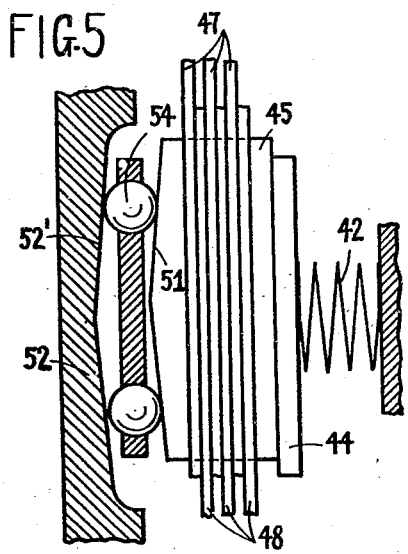
Fig. 5 is a diagram illustrative of a refinement of the above said principle.
Figure 4:
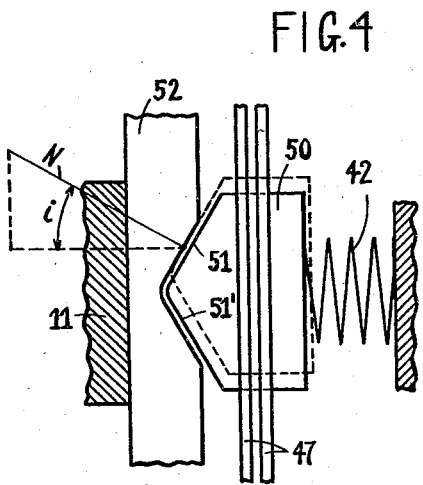
Fig. 4 is a diagram explanatory of the principle of operation of the embodiment shown in Fig. 3.

Such an embodiment of my invention is illustrated in Fig. 3, and its principles are explained with reference to Figures 4 and 5. The differential gear proper, as shown, is of the conventional type, and consists of a planet carrier in the form of a casing 11, of planetary bevel pinions 17 mounted in said casing on journals 18, and of two bevel gears 20, 21, which constitute the driven members of the differential gear. Any other type of differential gear could however also be used as part of a differential mechanism according to the present invention.

Spring 42, disposed intermediate the pinions 17, exert pressure to plates 43, which are integral with a circular ring 44. This ring transmits pressure to a part 45, which contains splines at 46 and a plurality of disks 47 held by said splines. The disks 47 alternate with other disks 48, which are held by splines 49 provided in the planetary casing 11. Part 45 contains an internal projection 50 provided with double helical surfaces 51, which will be separately explained with reference to Fig. 4 and also with reference to Fig. 5. A ring 52 engages said double helical surface, and on the other side bears against the plane side of casing 11. Ring 52 is positively connected with the hub of gears 20, 21 respectively by means of splines 53, which permit slight axial motion of said ring.

The operation will now be explained with reference to the diagram Fig. 4, whch can be considered as a simplified development of the parts adjacent the said double helical surfaces. These surfaces have opposite hands and in the development are shown as straight lines 51, 51' of opposite inclination. In the central position said surfaces 51, 51' do not engage ring 52, or not engage under pressure. The entire pressure of the springs 42 is then transmitted through the disks 47 and 48, see also Fig. 3. The frictional torque exerted thereby on disks 47, is transmitted through the splines 46 to part 45, which is thereby turned, so that one of the surfaces 51 or 51' engages ring 52. The frictional torque is then transmitted through surface 51 (Fig. 4) to ring 52, and thence through the splines 53 to the gears 20, 21 respectively.

Let it be assumed for convenience, that little or no friction exists between ring 52 and projection 50, which contact on helical surface 51. In this assumed case the pressure exerted between the two bodies is perpendicular to said surface 51. Let N denote the amount of the normal pressure, and $i$ the inclination angle or lead angle of surface 51. The peripheral component of normal pressure N is then (N sin $i$), and the axial component is (N cos $i$). It is seen that the pressure P of springs 42 is no more transmitted wholly to the disks 47 and 48, but part of it to ring 52, namely an amount (N cos $i$). The pressure which is still transmitted through the disks is therefore $(P-N \cos i)$. The following further symbols are introduced for convenience:

R=Mean radius of disks,
$r$=Mean radius of helical surface 51,
$n$=Number of frictional engagements, whose frictional torque is transmitted to part 45,
$m$=Coefficient of friction, which is a quantity depending on the degree of relative motion.

With these symbols the following formulas may be derived with the known methods of elementary mechanics:

Frictional torque $T = n\ m\ R\ (P-N \cos i)$ ... Equation I. This torque, according to the above, equals the torque transmitted to helical surface 51: $T = r\ N \sin i$; hence $$N = \frac{T}{r \sin i}.$$

The following formula may be derived by introducing the above amount of N in Equation I:

$$T = \frac{RP}{\frac{1}{nm} + \frac{R}{r \tan i}}$$

In this formula, the coefficient of friction $m$ is the only quantity, which is subject to change. When the proportions are so selected, that $$\frac{R}{r \tan i} = 4,$$

as a possible example, and when number $n$ is so chosen that the product $(nm)$ varies for instance between 1 and 5, then the quantity $$\left(\frac{1}{nm} + \frac{R}{r \tan i}\right)$$

assumes the values $$(1+4) = 5 \text{ and } \left(\frac{1}{5} + 4\right) = 4.2$$

in the extreme cases. The frictional torque T varies therefore only by a certain percentage, when the coefficient of friction changes in the ratio of one to five.

The change of the torque T can be further diminished by providing antifriction means, such as balls 54 suited to roll in helical grooves 51, 52', and constituting the operative connection between part 45 and ring 52. This is indicated in Fig. 5. The inclination angle $i$ may then advantageously be kept very small. A small angle $i$ increases the member $$\frac{R}{r \tan i}$$

of the above equation, and therefore reduces the variation of torque T.

Inasmuch as equal helical surfaces 51, 51' of opposite hands are provided, the device operates in the same manner in either direction.

It is understood that such changes and modifications may be made in my invention as fall within the limits of the appended claims.

What I claim and desire to secure by Letters Patent is:

1. In a differential mechanism for automotive vehicles, gears for transmitting torque from a driving member to two coaxial driven members, a clutch frictionally opposing relative motion between said two driven members, spring means for maintaining said clutch in continuous engagement, and means for keeping the frictional torque substantially constant, irrespective of the relative velocity of the surfaces engaged in frictional contact.

2. In a differential mechanism for automotive vehicles, gears for transmitting torque from a driving member to two coaxial driven members, a clutch frictionally opposing relative motion of the differential mechanism, spring means for maintaining said clutch in continuous engagement, and means for keeping the frictional torque substantially constant, irrespective of the relative velocity of the surfaces engaged in frictional contact, said means being suited to act equally irrespective of the direction of relative motion.

3. In a differential mechanism for automotive vehicles, means for transmitting torque from a driving member to two coaxial driven members, a clutch frictionally opposing relative motion of the differential mechanism, spring means for maintaining said clutch in engagement, and means for reducing the pressure of engagement with increasing frictional torque.

4. In a differential mechanism for automotive vehicles, gears for transmitting torque from a driving member to two coaxial driven members, a multiple disk clutch frictionally opposing relative motion of the differential mechanism, spring means for maintaining said clutch in engagement, and means for reducing the pressure of said engagement with increasing frictional torque, irrespective of the direction of relative motion.

5. In a differential mechanism for automotive vehicles, three coaxial members, means for operatively interconnecting said members, a friction clutch for slidably connecting two of said members, while exerting frictional torque between said members, a spring for maintaining said clutch in continuous engagement, a part movable relatively to the two members connected by said clutch and suited to transmit frictional torque, the arrangement being such, that motion of said part in the direction of said torque reduces the pressure of engagement of said clutch.

6. A differential mechanism containing three coaxial members, namely a planet carrier receiving power from a motor, and two gears forming part of the two driven members respectively, planetary pinions mounted in said planet carrier, said pinions meshing with said gears, a multiple disk clutch for slidably connecting two of said coaxial members while exerting frictional torque between said members, means for maintaining said clutch in engagement, and means for reducing the pressure of engagement with increasing frictional torque.

7. A differential mechanism containing three coaxial members, namely a planet carrier receiving power from a motor, and two bevel gears forming part of the two driven members respectively, planetary bevel pinions mounted in said planet carrier, said pinions meshing with said gears, a multiple disk clutch for connecting said planet carrier with either of said two bevel gears while exerting frictional torque, springs for maintaining said clutch in engagement, and means for reducing the pressure of engagement with increasing frictional torque, irrespective of the direction of relative motion.

8. In a differential mechanism for automotive vehicles, three coaxial members, means for operatively interconnecting said members, a clutch for exerting frictional torque between said members, means for effecting pressure in said clutch, a part suited to transmit frictional torque, means for moving said part in a helical path relatively to a member of said clutch, and means for decreasing the pressure of engagement in said clutch through helical motion of said part in direction of the frictional torque.

9. In a differential mechanism for automotive vehicles, three coaxial members, means for operatively interconnecting said members, a multiple disk clutch for exerting frictional torque between said members, a spring for effecting pressure between the disks of said clutch, a part suited to transmit frictional torque, means for moving said part in a helical path relatively to a member of said clutch, and means for decreasing the pressure of engagement in said clutch through helical motion of said part in the direction of the frictional torque.

10. In a differential mechanism for automotive vehicles, three coaxial members, means for operatively interconnecting said members, a clutch for exerting frictional torque between said members, means for effecting pressure in said clutch, a part suited to transmit frictional torque, helical guidances of opposite hand disposed adjacent said part, means for decreasing the pressure of engagement of said clutch through helical motion of said part along said guidances in the direction of the frictional torque, said part moving along helical guidances of opposite hand when moving in opposite directions.

11. In a differential mechanism for automotive vehicles, three coaxial members, means for operatively interconnecting said members, a clutch for exerting frictional torque between said members, a spring for effecting pressure in said clutch, a part suited to transmit frictional torque, means for moving said part in two different paths relatively to a member of said clutch, means for decreasing the pressure of engagement of said clutch through motion of said part in direction of said frictional torque, said part being suited to move along one path when the frictional torque is in one direction and along another path when the frictional torque is in opposite direction.

12. In a differential mechanism for automotive vehicles, gears for transmitting torque from a driving member to two coaxial driven members, a clutch frictionally opposing relative motion of the differential mechanism, spring means for maintaining said clutch in continuous engagement, said clutch being separate from said gears and axially movable independently of said gears, and means for changing the pressure of engagement of said clutch.

13. In a differential mechanism for automotive vehicles, gears for transmitting torque from a driving member to two coaxial driven members, a multiple disk clutch frictionally opposing relative motion of the differential mechanism, said clutch being separate from said gears and axially movable independently of said gears, and means for changing the pressure of engagement of said clutch.

14. A differential mechanism containing three coaxial members, namely one driving member and two driven members, one of said members being a planet carrier, two separate clutching units for frictionally connecting said planet carrier with the other two coaxial members respectively, and joint spring means for maintaining both clutching units in continuous engagement.

15. A differential mechanism containing three coaxial members, namely one driving member and two driven members, one of said members being a planet carrier, planetary pinions mounted in said planet carrier and operatively interconnecting said members, two separate clutching units for frictionally connecting said planet carrier with the other two of said coaxial members respectively, and a plurality of joint springs for maintaining both clutching units in continuous engagement, said springs being disposed intermediate said planetary pinions.

16. A differential mechanism containing three coaxial members, namely a driving member in the form of a planet carrier and two driven members, planetary pinions mounted in said planet carrier and operatively interconnecting said members, frictional means for partially locking the differential mechanism, a plurality of coil springs disposed parallel to the axis of the differential mechanism for maintaining said frictional means in continuous engagement, said coil springs being positioned intermediate said planetary pinions.

17. A differential mechanism containing three coaxial members, one of said members being a planet carrier, gearing for operatively interconnecting said members, a plurality of multiple disk friction clutches opposing relative motion of the differential mechanism, and a plurality of springs disposed outside of the center of the differential mechanism for maintaining said clutches in continuous engagement.

18. A differential mechanism containing three coaxial members, one of said members being a planet carrier, gearing for operatively interconnecting said members, a plurality of multiple disk friction clutches opposing relative motion of the differential mechanism, spring means for maintaining said clutches in continuous engagement, and means for changing the pressure of engagement of said clutches.

19. A differential mechanism, containing a driving member and two driven members coaxial with said driving member, gearing for operatively interconnecting said members, frictional means opposing relative motion of the differential mechanism, spring means for maintaining said frictional means in engagement under pressure, and automatic means for changing said pressure of engagement, the last named means being wholly disposed adjacent said driving member and driven members.

ERNEST WILDHABER.